United States Patent [19]
Sandstrom et al.

[11] Patent Number: 4,790,365
[45] Date of Patent: Dec. 13, 1988

[54] TIRE COMPOUNDS CONTAINING SYNDIOTACTIC-1,2-POLYBUTADIENE

[75] Inventors: Paul H. Sandstrom; Neil A. Maly, both of Tallmadge; Mark A. Marinko, Stow, all of Ohio

[73] Assignee: The Goodyear Tire & Rubber Company, Akron, Ohio

[21] Appl. No.: 95,205

[22] Filed: Sep. 11, 1987

[51] Int. Cl.[4] .................. B60C 1/00; B60C 21/04; C08L 9/00; C08L 15/02
[52] U.S. Cl. .................. 152/510; 152/DIG. 16; 525/236; 525/237
[58] Field of Search .............. 152/357, 510, DIG. 16; 525/236, 237

[56] References Cited
U.S. PATENT DOCUMENTS 4,220,564  9/1980  Tanimoto et al. ............ 525/237
4,394,473  7/1983  Winter et al. ............... 525/237

Primary Examiner—Allan M. Lieberman
Attorney, Agent, or Firm—Alvin T. Rockhill

[57] ABSTRACT

The subject invention discloses the use of syndiotactic-1,2-polybutadiene in the supporting carcass and/or innerliner of a tire. The incorporation of syndiotactic-1,2-polybutadiene into rubber compositions which are utilized in the supporting carcass or innerliner of tires greatly improves the green strength of those compositions. The incorporation of syndiotactic-1,2-polybutadiene into halogenated butyl rubbers which are utilized as innerliner compositions also greatly improves the scorch safety of such compositions. The subject invention more specifically discloses a pneumatic rubber tire which comprises a circumferential rubber tread, a supporting carcass therefor, two spaced beads, two rubber sidewalls connecting said beads and an innerliner; wherein said supporting carcass is comprised of from 1 to 25 phr of syndiotactic-1,2-polybutadiene having a melting point which is within the range of 120° C. to 190° C. and at least one rubber selected from the group consisting of polyisoprene, styrene-butadiene rubber, and polybutadiene rubber.

14 Claims, No Drawings

TIRE COMPOUNDS CONTAINING SYNDIOTACTIC-1,2-POLYBUTADIENE

BACKGROUND OF THE INVENTION

Synthetic elastomers have supplemented or replaced natural rubber to a great extent in the fabrication of tires and other rubber products. Synthetic rubbers have demonstrated physical properties which are superior to those of natural rubber in some respects. However, a major deficiency of many synthetic elastomers, including cis-1,4-polyisoprene, is a lack of green strength. This has been a particularly difficult problem in the fabrication of large rubber articles, such as tires. The abatement of this deficiency in many synthetic rubbers has long been sought by the industry and various means of improving the green strength of synthetic elastomers are known throughout the industry and described in the prior art.

The term "green strength" is commonly employed and generally understood by persons skilled in the rubber art, nevertheless it is a difficult term to precisely define. Green strength is basically the mechanical strength of an elastomer prior to vulcanization which allows it to be built into multiple component articles with little or no relative movement of the assembled components in such articles subsequent to assembly, but prior to being vulcanized. In other words, green strength is the mechanical strength required for fabricating multiple component rubber articles prior to the rubber in the article being cured. Pneumatic rubber tires are almost always composed of multiple rubber layers. It is necessary for the rubbers used in building such tires to possess adequate green strength in order for the tire being built to maintain its structural integrity during the building and vulcanizing procedures which must be carried out.

In elastomers which possess poor green strength the yield stress which the unvulcanized elastomer exhibits during deformation is low and the stress drops off quite rapidly as the deformation continues. Unvulcanized strips or other forms of such elastomers often pull apart in a taffy-like manner during building operations. Green strength is typically quantified in terms of the stress/strain curves of the unvulcanized elastomer. Usually, the performance of a green compound (unvulcanized) is based upon two points of the stress/strain curve, namely the first peak or yield point and the ultimate or breaking tensile point. Improvement in either of these stress/strain properties indicates improved green strength.

Numerous additives have been utilized in association with various elastomers in order to improve their green strength. However, the utilization of such additives commonly causes unwanted results, such as a rise in the hysteresis of the elastomer. For various reasons the incorporation of additives into synthetic elastomers in order to improve green strength has generally not proven to be satisfactory. Electron beam precure (microwave precure) is a technique which has gained wide commercial acceptance as a means of improving the green strength of synthetic elastomers. For instance, electron beam precure is widely used in the tire industry to improve the green strength of synthetic elastomers utilized in building tires. However, electron beam precure techniques are costly. Nevertheless, electron beam precure often represents the only acceptable means for providing adequate green strength to maintain dimensional stability during tire building and curing procedures.

SUMMARY OF THE INVENTION

It has been unexpectedly found that syndiotactic-1,2-polybutadiene can be incorporated into synthetic elastomers in order to improve the green strength thereof. This invention is of particular utility in improving the green strength of synthetic rubbers which are used in building tires. The supporting carcass (reinforcing carcass) of tires is particularly prone to distortion during tire building and curing procedures. For this reason the incorporation of syndiotactic-1,2-polybutadiene into elastomers which are used as the supporting carcass for tires has particular utility. The subject invention more specifically discloses a pneumatic rubber tire which comprises a circumferential rubber tread, a supporting carcass therefor, two spaced beads, and two rubber sidewalls; wherein said supporting carcass is comprised of from 1 to 25 phr of syndiotactic-1,2-polybutadiene having a melting point which is within the range of 120° C. to 190° C. and at least one rubber selected from the group consisting of polyisoprene, styrene-butadiene rubber, and butadiene rubber.

The present invention also discloses a method of preparing a pneumatic rubber tire which includes (a) building an unvulcanized tire which is comprised of a circumferential rubber tread, a supporting carcass therefor, two spaced beads, two rubber sidewalls connecting said beads and an innerliner, and (b) shaping and vulcanizing said tire under conditions of heat and pressure: the improvement which comprises utilizing as the supporting carcass a rubber composition which is comprised of from 1 to 25 phr of syndiotactic-1,2-polybutadiene and at least one rubber selected from the group consisting of polyisoprene, styrene-butadiene rubber, and butadiene rubber, wherein said syndiotactic-1,2-polybutadiene has a melting point which is within the range of 120° C. to 190° C.

It is also important for the elastomeric material which is utilized as the innerliner of a pneumatic tire to have good green strength during the tire building and curing operations. For this reason the incorporation of syndiotactic-1,2-polybutadiene into tire innerliner compositions also has great utility. Additionally, the incorporation of syndiotactic-1,2-polybutadiene into innerliner compositions which are comprised of halogenated butyl rubbers results in the composition having better scorch resistance. The subject invention accordingly discloses a pneumatic rubber tire which comprises a circumferential rubber tread, a supporting carcass therefor, two spaced beads, two rubber sidewalls connecting said beads and an innerliner; wherein said innerliner is comprised of from 1 to 30 phr of syndiotactic-1,2-polybutadiene and at least one rubber selected from the group consisting of polyisoprene and halogenated butyl rubber, wherein said syndiotactic-1,2-polybutadiene has a melting point which is within the range of 120° C. to 160° C. The present invention also reveals a method of preparing a pneumatic rubber tire which includes (a) building an unvulcanized tire which is comprised of a circumferential rubber tread, a supporting carcass therefor, two spaced beads, two rubber sidewalls connecting said beads and an innerliner, and (b) shaping and vulcanizing said tire under conditions of heat and pressure; the improvement which comprises utilizing as the innerliner a rubber composition which is comprised of from 1 to 30 phr of syndiotactic-1,2-polybutadiene and at least one rubber selected from the group consisting of polyisoprene and halogenated butyl rubber, wherein said syndiotactic-1,2-polybutadiene has a melting point which is within the range of 120° C. to 160° C.

DETAILED DESCRIPTION OF THE INVENTION

The syndiotactic-1,2-polybutadiene (SPBD) used in the practice of the subject invention normally has more than 70% of its monomeric units in a syndiotactic-1,2-configuration. In most cases, the SPBD used in the practice of this invention will have at least about 90% of its monomeric units in a syndiotactic-1,2-configuration. SPBD can be prepared in an inert organic solvent utilizing the technique described in U.S. Pat. No. 3,901,868 or in an aqueous medium utilizing the process described in U.S. Pat. No. 4,506,031. U.S. Pat. No. 4,506,031 more specifically reveals a process for producing polybutadiene composed essentially of SPBD comprising the steps of:

(A) preparing a catalyst component solution by dissolving, in an inert organic solvent containing 1,3-butadiene (a) at least one cobalt compound selected from the group consisting of (i) β-diketone complexes of cobalt, (ii) β-keto acid ester complexes of cobalt (iii) cobalt salts of organic carboxylic acids having 6 to 15 carbon atoms, and (iv) complexes of halogenated cobalt compounds of the formula $CoX_n$, wherein X represents a halogen atom and n represents 2 or 3, with an organic compound selected from the group consisting of tertiary amine alcohols, tertiary phosphines, ketones, and N,N-dialkylamides, and (b) at least one organoaluminum compound of the formula $AlR_3$, wherein R represents a hydrocarbon radical of 1 to 6 carbon atoms;

(B) preparing a reaction mixture by mixing said catalyst component solution with a 1,3-butadiene/water mixture containing desired amounts of said 1,3-butadiene:

(C) preparing a polymerization mixture by mixing carbon disulfide throughout said reaction mixture, and (D) polymerizing said 1,3-butadiene in said polymerization mixture into polybutadiene while agitating said polymerization mixture. In the process described therein the crystallinity and melting point of the SPBD can be controlled by adding alcohols, ketones, nitriles, aldehydes or amides to the polymerization mixture.

The SPBD utilized in making the supporting carcass for tires has a melting point which is within the range of 120° C. to 190° C. It is generally preferred for the SPBD utilized in making the supporting carcass for tires to have a melting point which is within the range of 140° C. to 175° C. with a melting point which is within the range of 150° C. to 165° C. being most preferred. The SPBD which is utilized in tire innerliners has a melting point which is within the range of 120° C. to 160° C. It is normally preferred for the SPBD which is utilized in tire innerliners to have a melting point within the range of 125° C. to 150° C. It is generally most preferred for the SPBD which is utilized in innerliners for tires to have a melting point which is within the range of 130° C. to 140° C. The melting points referred to herein are the minimum endotherm values determined from DSC (differential scanning calorimetry) curves.

The SPBD used in the tire compounds of this invention is incorporated therein in powder form. In other words, the SPBD is in the form of a powder at the time that it is compounded into the rubber utilized in making the tire carcass or tire innerliner. The SPBD utilized in accordance with this invention can be reduced to powder form by grinding or another appropriate technique. The SPBD powder utilized will have a particle size of less than about 40 mesh (less than 420 microns). It is preferred for the SPBD powder to have a particle size of 60 mesh (less than 250 microns) and more preferred for the SPBD powder to have an even smaller particle size, for instance, 140 mesh (less than 105 microns).

The SPBD powder which is utilized in innerliner or carcass compounds can be mixed into the compound utilizing standard mixing procedures. However the mixing is carried out at a temperature which is at least as high as the melting point of the SPBD being used. During the mixing procedure the SPBD powder is fluxed into the rubber and additional compounding ingredients being utilized. Such mixing is typically carried out in a banbury mixer, in a mill mixer, or in some other suitable type of mixing device.

The tire carcass compounds of this invention are comprised of from 1 phr to 25 phr of SPBD and at least one rubber selected from the group consisting of polyisoprene, styrene-butadiene rubber, and butadiene rubber. Other conventional compounding ingredients are also, of course, included in the carcass compound formulation. For instance, such carcass compounds also typically include carbon black, sulfur or sulfur containing compounds, accelerators, and antidegradants The polyisoprene utilized in such carcass compounds can be natural rubber or a synthetic polyisoprene. The butadiene rubbers utilized in such carcass compounds can be high cis polybutadiene, trans polybutadiene, or rubbery polybutadienes having mixed microstructures. The SPBD utilized in accordance with this invention is a thermal plastic resin and is not considered to be a rubber in calculating phr (parts per hundred parts of rubber). The carcass compounds made in accordance with the subject invention will preferably contain from 2.5 phr to 15 phr of the SPBD. It is most preferred for tire carcass compounds to contain from 5 phr to 10 phr of SPBD.

Persons skilled in the art will be able to adjust the amounts and types of compounding ingredients required so as to get the combination of properties desired. As a general rule, the amount of carbon black required in such rubber compounds decreases with increasing amounts of SPBD. In fact, higher melting SPBD can be used so as to replace some of the carbon black in carcass compounds. This is of particular benefit in applications where weight reduction is sought, such as in aircraft tires and racing tires. This is because SPBD has a density of about 0.9 which is only about one-half the density of carbon black which has a density of about 1.8. Thus, the replacement or partial replacement of carbon black with SPBD results in a substantial weight reduction. Lower melting SPBD provides improved rubber to rubber and rubber to fabric adhesion Additionally, lower melting SPBD is more easily incorporated into rubber compounds and does not appreciably raise modulus. Thus, the selection of a SPBD based upon its melting point will be dictated somewhat by the properties desired for the tire being built.

The supporting carcass of tires will usually contain one or more reinforcing elements, such as textile fabric reinforcement. The supporting carcass of tires will normally contain circumferential belt plies which are positioned beneath the tread portion. The reinforcing fabric used in the supporting carcass can be comprised of various suitable materials, such as glass, steel, polyester, nylon, aramid, and the like. In addition to improved green strength, SPBD can also be used to increase the rubber to metal adhesion of wire coating formulations and to increase the stiffness of apex formulations.

The tire innerliner compounds used in accordance with this invention will contain from 1 phr to 30 phr of SPBD. Such innerliner compounds will preferably contain from 2.5 phr to 15 phr of SPBD and will more preferably contain from 5 phr to 10 phr of SPBD. Such innerliner compositions will also contain polyisoprene and/or one or more halogenated butyl rubbers. Since halogenated butyl rubbers have outstanding gas barrier resistance, they are highly preferred for utilization as the rubber component in tire innerliner formulations. For instance, bromobutyl rubbers and chlorobutyl rubbers are an excellent choice for utilization in tire innerliner formulations with chlorobutyl rubber being highly preferred. Polyisoprene in the form of natural rubber is also sometimes used in tire innerliner formulations. For example, natural rubber is often used in farm tractor tires and heavy equipment tires. This is because such applications demand a high level of building tack for large tire fabrication. Such tires are not normally inflated to high air pressures and typically have large air volume to surface ratios Thus, such applications do not demand superior gas barrier resistance but do require good building tack which makes natural rubber an excellent choice for use in such applications.

The utilization of SPBD in tire innerliner formulations results in greatly improved green strength. Additionally, the incorporation of SPBD into tire innerliner formulations which contain halogenated butyl rubbers also results in improved scorch resistance. Since SPBD has relatively good gas barrier resistance the incorporation of it into innerliner formulations does not increase gas permeability to a significant extent. In fact, the incorporation of SPBD into tire innerliner formulations which are comprised of a natural rubber may even improve the gas barrier resistance of such compounds.

The tire innerliner and supporting carcass formulations of this invention are built into tires using standard techniques well known throughout the art. However, the utilization of SPBD in such rubber formulations eliminates the need for electron beam precure in order to improve green strength. Additionally, the incorporation of SPBD into such tire rubber formulations eliminates the need for incorporating resorcinol based resin therein to improve green strength. Thus, by incorporating SPBD into tire innerliner and tire carcass formulations the need for incorporating resorcinol into such formulations and/or utilizing an electron beam precure technique is totally eliminated.

Various embodiments of the process of the present invention in practice are illustrated by the following working examples. These examples are intended merely to illustrate the present invention and not in any sense to limit the scope in which it can be practiced. Unless specifically indicated otherwise, all parts and percentages are given by weight. The SPBD utilized in the following examples was synthesized in an aqueous medium in the general manner described in U.S. Pat. No. 4,506,031. Cure properties were determined using a Monsanto oscillating disc rheometer which was operated at a temperature of 150° C. and at a frequency of 11 hertz. A description of oscillating disc rheometers can be found in the Vanderbilt Rubber Handbook edited by Robert O. Babbit (Norwalk, Conn., R. T. Vanderbilt Company, Inc., 1978), pages 583–591. The use of this cure meter and standardized values read from the curve are specified in ASTM D-2084. A typical cure curve obtained on an oscillating disc rheometer is shown on page 588 of the 1978 edition of the Vanderbilt Rubber Handbook.

In such an oscillating disc rheometer compounded rubber samples are subjected to an oscillating shearing action of constant amplitude. The torque of the oscillating disc embedded in the stalk that is being tested that is required to oscillate the rotor at the vulcanization temperature is measured. The values obtained using this cure test are very significant since changes in the rubber or the compounding recipe are very readily detected. It is obvious that it is normally advantageous to have a fast cure rate.

The following tables report cure properties that were determined from cure curves that were obtained for the various rubber formulations that were prepared. These properties include a torque minimum (Min Torque), a torque maximum (Max Torque), the total increase in torque (Delta Torque), minutes to a one point rise in torque (t1 min.), minutes to 25% of the torque increase (t25 min.), and minutes to 90% of the torque increase (t90 min.).

Green strength was determined using an Instron machine which was equipped with a "C" load shell that was operated at a crosshead speed of 20 inches per minute (50.8 cm/minute). Samples were prepared from milled uncured stock which was 0.05 inches (0.127 cm) thick that was enclosed in Holland paper. Test specimens which were 6 inches (15.24 cm) long and 0.5 inch (1.27 cm) wide were died out of the samples. The Holland paper was carefully removed from the test specimens prior to testing in order to avoid pre-stressing. The average thickness of the test specimens was determined with a dial micrometer gauge to the nearest 0.001 inch (0.00254 cm). The test specimens were then tested using a 1 inch (2.54 cm) jaw space. Tensile strength and elongation were determined based upon the original cross sectional area of the uncured test specimen.

Strebler adhesion testing was done to determine the interfacial adhesion between various rubber formulations that were prepared. The interfacial adhesion was determined by pulling one compound away from another at a right angle to the untorn test specimen with the two ends being pulled apart at a 180° angle to each other using an Instron machine. The area of contact was determined from placement of a Mylar sheet between the compounds during cure. A window in the Mylar allowed the two materials to come into contact with each other during testing.

COMPARATIVE EXAMPLE 1

In this experiment a standard carcass formulation for utilization in farm tractors was prepared as a control. The rubber formulation prepared was mixed in a laboratory BR Banbury mixer having a capacity of about 1,300 cc. The various components utilized in making the carcass formulation were mixed at a temperature within the range of about 350° F. (177° C.) to about 360° F. (182° C.). The rubber formulation made in this experiment was prepared by mixing in the Banbury mixer 52.5 parts of natural rubber, 17.5 parts of very high cis-1,2-polybutadiene, 41.25 parts of oil extended styrene-butadiene rubber, 60 parts of filler including carbon black, and 15.45 parts of miscellaneous rubber chemicals, including extender oil, sulfur, zinc oxide, accelerators and antidegradants.

The compounded rubber made in this experiment was tested for various properties, such as cure characteristics and green strength. Various properties of the rubber prepared in this experiment are shown in Table I.

TABLE I

| | \multicolumn{10}{c}{Example No.} | | | | | | | | | |
|---|---|---|---|---|---|---|---|---|---|---|
| | 1 | 2 | 3 | 4 | 5 | 6 | 7 | 8 | 9 | 10 |
| \multicolumn{11}{c}{Cure Properties} | | | | | | | | | | |
| Max. Torque | 35.7 | 36.5 | 37.7 | 39.0 | 35.9 | 36.3 | 37.1 | 35.2 | 34.5 | 34.0 |
| Min. Torque | 7.0 | 8.0 | 8.4 | 8.8 | 7.3 | 7.8 | 8.4 | 7.5 | 7.4 | 7.6 |
| Delta Torque | 28.7 | 28.5 | 29.3 | 31.2 | 28.6 | 28.5 | 28.7 | 27.7 | 27.1 | 26.4 |
| t1 min. | 4.3 | 4.4 | 4.3 | 4.2 | 4.4 | 4.3 | 4.3 | 4.5 | 4.5 | 4.5 |
| t25 min. | 6.1 | 6.1 | 6.2 | 6.3 | 6.2 | 6.1 | 6.1 | 6.2 | 6.4 | 6.5 |
| t90 min. | 12.8 | 13.0 | 13.1 | 13.5 | 13.5 | 13.3 | 13.3 | 13.4 | 14.0 | 14.4 |
| \multicolumn{11}{c}{Green Strength (Neutron/Sq. Cm.)} | | | | | | | | | | |
| Ini. Strength | 23.5 | 29.5 | 29.9 | 31.6 | 26.9 | 28.2 | 28.7 | 28.0 | 27.1 | 28.9 |
| Ini. Elon. % | 40 | 48 | 40 | 32 | 48 | 40 | 28 | 52 | 32 | 32 |
| 100% Elon. | 27.1 | 35.3 | 37.9 | 48.8 | 31.8 | 30.0 | 42.4 | 28.6 | 34.6 | 37.2 |
| 200% Elon. | 30.4 | 49.4 | 44.5 | 61.8 | 39.3 | 35.1 | 57.8 | 30.9 | 42.4 | 45.2 |
| 300% Elon. | 32.6 | 57.4 | 49.5 | 69.1 | 44.6 | 39.0 | 66.2 | 33.8 | 47.0 | 52.0 |
| 500% Elon. | 35.1 | 65.4 | 56.5 | 76.2 | 52.0 | 47.1 | 75.1 | 40.1 | 54.5 | 58.7 |
| Ult. Strength | 35.9 | 67.0 | 59.0 | 76.5 | 54.2 | 50.4 | 75.7 | 45.5 | 57.4 | 60.5 |
| Ult. Elon. % | 1030 | 680 | 735 | 670 | 720 | 840 | 655 | 910 | 790 | 735 |
| \multicolumn{11}{c}{Rheovibron} | | | | | | | | | | |
| Tan 60° C. | .060 | .061 | .066 | .070 | .056 | .062 | .063 | .055 | .056 | .060 |
| E' (60° C,), MPa | 2.96 | 2.98 | 3.14 | 3.52 | 2.67 | 3.12 | 3.66 | 2.93 | 3.32 | 3.32 |
| \multicolumn{11}{c}{Autographic Stress/Strain-Original - 90% Cure + 10 min.} | | | | | | | | | | |
| Tensile MPa | 14.5 | 13.5 | 13.3 | 13.1 | 14.5 | 14.5 | 15.0 | 14.2 | 13.7 | 14.9 |
| Elongation % | 405 | 390 | 360 | 320 | 405 | 405 | 380 | 400 | 390 | 390 |
| 100% Mod. MPa | 1.9 | 1.9 | 2.1 | 2.8 | 1.8 | 2.0 | 2.6 | 1.9 | 2.1 | 2.5 |
| 200% Mod. MPa | 5.1 | 5.0 | 5.6 | 7.1 | 5.1 | 5.5 | 6.5 | 2.2 | 5.5 | 6.2 |
| 300% Mod. MPa | 9.8 | 9.4 | 10.1 | 12.0 | 9.6 | 10.1 | 11.1 | 9.8 | 10.0 | 10.8 |
| \multicolumn{11}{c}{Strebler Adhesion Original 95° C., in Newtons} | | | | | | | | | | |
| To Self | 31.6 | 33.9 | 33.7 | 34.7 | 34.1 | 29.0 | 31.1 | 47.6 | 54.5 | 38.9 |
| To SWC* | 48.8 | 56.7 | 47.8 | 53.3 | 51.9 | 41.7 | 55.9 | 67.5 | 85.1 | 66.3 |
| \multicolumn{11}{c}{Strebler Adhesion at 95° C. (Aged 14 Days), in Newtowns} | | | | | | | | | | |
| To Self | 15.1 | 16.9 | 16.5 | 16.2 | 15.4 | 16.0 | 17.0 | 17.8 | 19.4 | 20.6 |
| To SWC | 17.7 | 23.6 | 17.9 | 13.7 | 17.7 | 20.0 | 19.4 | 18.7 | 30.6 | 27.8 |
| \multicolumn{11}{c}{Rebound} | | | | | | | | | | |
| % (Cold) | 75.2 | 74.1 | 72.4 | 70.1 | 73.5 | 73.5 | 71.2 | 74.1 | 74.1 | 72.4 |
| % (Hot) | 83.0 | 83.0 | 82.5 | 81.2 | 82.5 | 81.8 | 81.8 | 82.5 | 81.8 | 83.0 |

*SWC = a standare tire sidewall compound

EXAMPLES 2-10

In this series of experiments SPBD was incorporated into the supporting carcass composition described in Example 1. In Examples 2, 5, and 8, 2.5 phr of SPBD was added to the compounded rubber. In Examples 4, 6, and 9, 5 phr of SPBD was added and in Examples 4, 7, and 10, 10 phr of SPBD was added. The SPBD utilized in Examples 8, 9 and 10 had a melting point of 150° C. The SPBD utilized in Examples 5, 6, and 7 had a melting point of 167° C. and the SPBD utilized in Examples 2, 3, and 4 had a melting point of 180° C. The rubber blends containing SPBD which were prepared were made by mixing the various components described in Example 1 in the laboratory BR Banbury mixer which was operated at a temperature within the range of about 320° F. (160° C.) to 360° F. (182° C.).

Various physical properties of the compounded rubbers prepared are shown in Table I. Examples 2-10 clearly show greatly improved green strength over Comparative Example 1. Accordingly, it is very clear that the incorporation of SPBD into the supporting carcass compound greatly improved its green strength. As can be determined from Table I, green strength showed a steady increase at constant SPBD level as the melting temperature of the SPBD increased. However, it should be noted that higher melting SPBD requires a higher mixing temperature in the Banbury and is accordingly more difficult to blend. Also, higher mixing temperatures can result in degradation of the rubbers utilized in the blend.

EXAMPLE 11

Farm tires were built utilizing a supporting carcass compound which contained SPBD. The supporting carcass compound was prepared by mixing 52.5 parts of natural rubber, 17.5 parts of very high cis-1,2-polybutadiene, 41.25 parts of an oil extended SBR, 60 parts of filler including carbon black, 5.05 phr of SPBD having a melting point of 167° C., and 15.45 parts of various rubber chemicals including extender oil, zinc oxide, sulfur, accelerators and antioxidants in a standard Banbury mixer. The supporting carcass compound prepared was then built into 20.8 R38* farm tires of the Goodyear Dyna Torque ® radial design. The tires were built utilizing standard tire building procedures with two notable exceptions. Electron beam precure is utilized in the standard commercial process for building 20.8 R38* Dyna Torque ® farm tires. However, electron beam precure was not required in building the farm tires of this example. This is because the reinforcing carcass compound had sufficient green strength without the standard electron beam precure treatment. It is also conventional to use a small amount of resorcinol (generally from about 1 to about 5 parts) in supporting carcass compounds to improve green strength. However, no resorcinol was utilized in the supporting carcass compound utilized in building the farm tires of this example. Thus, the farm tires were built utilizing standard commercial techniques except that (1) electron beam precure was not utilized and (2) no resorcinol was utilized in the supporting carcass compound.

The tires built in this example have proven to be satisfactory in all respects. Dynamometer testing of the tires built has shown satisfactory results.

EXAMPLES 12-21

In this series of experiments, agricultural tire innerliner compounds were prepared. These compounds were prepared by mixing in a laboratory BR Banbury mixer various amounts of SPBD of different melting points with 70 parts of natural rubber, 41.25 parts of oil extended styrene-butadiene rubber, 50 parts of carbon black, 10 parts of filler, 16 parts of oils and wax, and 8.65 parts of various rubber chemicals including zinc oxide and sulfur. The amount and melting point of the SPBD utilized in each of these examples is indicated in Table II. Example 12 was run as a comparative example and the compound prepared did not include any SPBD.

TABLE II

| | \multicolumn{10}{c}{Example No.} | | | | | | | | | |
|---|---|---|---|---|---|---|---|---|---|---|
| | 12 | 13 | 14 | 15 | 16 | 17 | 18 | 19 | 20 | 21 |
| SPBD (150° C.) | 0 | 0 | 0 | 0 | 0 | 0 | 0 | 2.5 | 5.0 | 10 |
| SPBD (167° C.) | 0 | 0 | 0 | 0 | 2.5 | 5.0 | 10 | 0 | 0 | 0 |
| SPBD (180° C.) | 0 | 2.5 | 5.0 | 10 | 0 | 0 | 0 | 0 | 0 | 0 |
| \multicolumn{11}{c}{Cure Properties} |
| Max. Torque | 25.5 | 25.5 | 26.5 | 27.8 | 26.2 | 27.7 | 27.8 | 25.9 | 26.1 | 25.9 |
| Min. Torque | 6.0 | 6.2 | 6.4 | 6.9 | 6.4 | 6.8 | 7.5 | 6.1 | 6.6 | 6.7 |
| Delta Torque | 19.5 | 19.3 | 20.1 | 20.9 | 19.8 | 20.9 | 20.3 | 19.8 | 19.5 | 19.2 |
| t1 min. | 8.8 | 8.7 | 8.7 | 8.9 | 8.6 | 8.2 | 8.5 | 8.6 | 8.4 | 8.7 |
| t25 min. | 11.6 | 11.6 | 11.6 | 11.7 | 11.4 | 11.1 | 11.5 | 11.2 | 11.1 | 11.8 |
| t90 min. | 27.2 | 28.2 | 27.7 | 28.3 | 26.4 | 26.4 | 27.5 | 26.6 | 27.1 | 29.5 |
| \multicolumn{11}{c}{Green Strength (Neutons/Sq. Cm.)} |
| Ini. Strength | 29.3 | 26.6 | 25.2 | 35.3 | 23.3 | 27.1 | 30.3 | 29.7 | 24.8 | 29.8 |
| Ini. Elon. % | 40 | 24 | 16 | 12 | 16 | 36 | 30 | 28 | 28 | 20 |
| 100% Elon. | 32.8 | 51.1 | 44.5 | 94.9 | 51.1 | 50.7 | 61.6 | 60.5 | 47.9 | 62.5 |
| 200% Elon. | 36.6 | 66.4 | 57.5 | 123.4 | 64.5 | 74.4 | 85.0 | 73.2 | 62.0 | 79.6 |
| 300% Elon. | 38.8 | 67.3 | 65.8 | 122.2 | 70.7 | 84.5 | 103.2 | 76.8 | 68.9 | 87.4 |
| 500% Elon. | 46.7 | 69.1 | 77.7 | — | 79.9 | 99.8 | 129.8 | 78.2 | 77.2 | — |
| Ult. Strength | 82.0 | 71.7 | 83.0 | 125.3 | 80.6 | 107.9 | 137.9 | 78.2 | 79.2 | 91.5 |
| Ult. Elon. % | 1165 | 715 | 706 | 415 | 645 | 735 | 700 | 560 | 660 | 460 |
| \multicolumn{11}{c}{Rheovibron} |
| Tan 60° C. | .129 | .135 | .130 | .127 | .126 | .124 | .120 | .124 | .119 | .116 |
| E' (60° C.), MPa | 2.77 | 2.83 | 3.20 | 3.82 | 2.69 | 3.33 | 4.25 | 3.29 | 3.11 | 3.23 |
| \multicolumn{11}{c}{Autographic Stress/Strain-Original - 90% Cure + 10 Min.} |
| Tensile MPa | 17.8 | 16.3 | 16.6 | 12.7 | 17.5 | 17.3 | 16.8 | 15.6 | 17.2 | 15.3 |
| Elongation % | 710 | 665 | 640 | 475 | 640 | 640 | 585 | 620 | 660 | 595 |
| 100% Mod MPa | 9.9 | 1.0 | 1.0 | 1.8 | 1.2 | 1.2 | 1.7 | 1.2 | 1.2 | 1.7 |
| 200% Mod MPa | 2.3 | 2.5 | 3.0 | 4.1 | 3.0 | 3.0 | 3.8 | 2.9 | 3.1 | 3.7 |
| 300% Mod MPa | 4.4 | 4.7 | 5.4 | 7.1 | 5.5 | 5.5 | 6.7 | 5.2 | 5.6 | 6.2 |
| \multicolumn{11}{c}{Strebler Adhesion Original, 95° C., in Newtons} |
| To Self | 200 | 215 | 215 | 140 | 156 | 128 | 140 | 152 | 146 | 137 |
| To SWC | 116 | 95.9 | 116 | 65.4 | 67 | 57 | 66.9 | 75 | 67 | 73.8 |
| \multicolumn{11}{c}{Strebler Adhesion at 95° C. (Aged 14 Days), in Newtons} |
| To Self | 113.8 | 135.1 | 142.2 | 82.1 | 78.5 | 67.2 | 73.1 | 75.7 | 61.1 | 46.8 |
| To SWC | 42.2 | 37.3 | 45.6 | 17.8 | 21.4 | 19.6 | 22.2 | 20.7 | 20.9 | 32.4 |
| \multicolumn{11}{c}{Rebound} |
| % (Cold) | 57 | 56 | 55.5 | 53 | 53.5 | 59 | 56.5 | 55 | 61 | 56 |
| % (Hot) | 68.5 | 67.9 | 68.5 | 66.7 | 67.9 | 70.1 | 69.6 | 69.6 | 71.2 | 67.3 |

EXAMPLES 22-28

In this series of experiments, a chlorobutyl tire innerliner compound was prepared utilizing SPBD. In this series of experiments, 10, 20, or 30 phr of SPBD having a melting point of 131° C. or 150° C. was added to the chlorobutyl innerliner compound prepared. These compounds were prepared by mixing in a laboratory BR Banbury mixer the amount of SPBD shown in Table III with 100 parts of chlorobutyl rubber, 50 parts of carbon black, 5 parts of oils, and 6.95 parts of various rubber chemicals including sulfur. The chlorobutyl innerliner compound made had the properties shown in Table III.

TABLE III

| | \multicolumn{7}{c}{Example No.} | | | | | | |
|---|---|---|---|---|---|---|---|
| | 22 | 23 | 24 | 25 | 26 | 27 | 28 |
| SPBD (131° C.) | None | 10 | 20 | 30 | None | None | None |
| SPBD (150° C.) | None | None | None | None | 10 | 20 | 30 |
| \multicolumn{8}{c}{Cure Properties} |
| Max. Torque | 19.1 | 19.5 | 19.5 | 19.0 | 19.8 | 21.0 | 21.5 |
| Min. Torque | 8.4 | 6.9 | 6.5 | 6.3 | 7.5 | 8.0 | 8.4 |
| Delta Torque | 10.7 | 12.6 | 13.0 | 12.7 | 12.3 | 13.0 | 13.1 |
| t2 min. | 5.2 | 7.4 | 8.8 | 10.4 | 7.0 | 8.0 | 9.0 |
| t25 min. | 6.0 | 8.4 | 10.2 | 12.0 | 8.2 | 9.4 | 10.6 |
| t90 min. | 22.0 | 37.0 | 54.0 | 60.0 | 27.0 | 39.0 | 42.0 |
| \multicolumn{8}{c}{Green Strength (Neutons/Sq. Cm.)} |
| Ini. Strength | 34.7 | 35.9 | 47.7 | 58.8 | 40.5 | 62.9 | 79.8 |
| Ini. Elon. % | 100 | 76 | 80 | 66 | 80 | 80 | 90 |
| 100% Elon. | 34.7 | 35.3 | 47.3 | 56.2 | 39.9 | 63.0 | 79.8 |
| 200% Elon. | 33.6 | 29.5 | 37.9 | 41.8 | 32.5 | 52.3 | 63.5 |

TABLE III-continued

|  | Example No. | | | | | | |
|---|---|---|---|---|---|---|---|
|  | 22 | 23 | 24 | 25 | 26 | 27 | 28 |
| 300% Elon. | 30.2 | 23.9 | 28.9 | 29.9 | 24.1 | 41.1 | 49.7 |
| 500% Elon. | 23.2 | 15.4 | 18.0 | 17.6 | 12.6 | 28.4 | 33.9 |
| Ult. Strength | 8.8 | 0.6 | 2.4 | 3.6 | 2.7 | 6.5 | 8.3 |
| Ult. Elon. % | 1900+ | 1900+ | 1900+ | 1900+ | 1900+ | 1900+ | 1900+ |
| Rheovibron | | | | | | | |
| Tan 60° C. | .166 | .163 | .144 | .139 | .157 | .150 | .136 |
| E' (60° C.), MPa | 2.48 | 3.78 | 5.34 | 6.28 | 4.23 | 6.24 | 7.15 |
| Autographic Stress/Strain-Original - 36 Minute Cure | | | | | | | |
| Tensile MPa | 10.2 | 9.6 | 9.4 | 9.4 | 8.1 | 7.6 | 7.2 |
| Elongation % | 900 | 800 | 660 | 650 | 675 | 545 | 360 |
| 100% Mod MPa | 0.7 | 1.2 | 1.9 | 2.4 | 1.6 | 2.1 | 3.2 |
| 200% Mod MPa | 1.7 | 2.2 | 3.2 | 3.7 | 2.8 | 3.5 | 5.0 |
| 300% Mod MPa | 3.0 | 3.3 | 4.5 | 4.9 | 4.0 | 4.9 | 6.6 |
| Autographic Stress/Strain-Aged 14 Days at 70° C. - 36 Minute Cure | | | | | | | |
| Tensile MPa | 9.7 | 9.8 | 9.8 | 9.6 | 8.0 | 7.4 | 6.2 |
| Elongation % | 720 | 700 | 620 | 570 | 560 | 340 | 210 |
| 100% Mod MPa | 1.2 | 1.7 | 2.4 | 2.9 | 2.0 | 3.1 | 4.2 |
| 200% Mod MPa | 2.8 | 3.1 | 4.0 | 4.6 | 3.4 | 5.0 | 6.2 |
| 300% Mod MPa | 4.3 | 4.5 | 5.5 | 6.1 | 5.0 | 6.9 | — |
| Strebler Adhesion Original, 95° C., in Newtons | | | | | | | |
| To Self | 84.0 | 94.0 | 114.2 | 132.2 | 144.7 | 123.1 | 78.4 |
| To SWC | 7.5 | 12.1 | 20.8 | 29.1 | 21.1 | 26.9 | 30.9 |
| Strebler Adhesion at 95° C. (Aged 14 Days), in Newtons | | | | | | | |
| To Self | 116.7 | 103.8 | 89.9 | 112.2 | 89.4 | 82.8 | 48.0 |
| To SWC | 30.4 | 40.5 | 50.7 | 38.1 | 32.8 | 30.2 | 32.2 |

EXAMPLES 29-38

In this series of experiments, a supporting carcass compound for passenger tires was prepared. It was made by mixing in a laboratory BR Banbury mixer the amount and type of SPBD shown in Table IV with 70 parts of natural rubber, 41.25 parts of oil extended SBR, 50 parts of carbon black, and about 18.25 parts of various rubber chemicals including extender oil, zinc oxide and sulfur. The reinforcing carcass compound prepared had the properties shown in Table IV.

TABLE IV

|  | Example No. | | | | | | | | | |
|---|---|---|---|---|---|---|---|---|---|---|
|  | 29 | 30 | 31 | 32 | 33 | 34 | 35 | 36 | 37 | 38 |
| SPBD (131° C.) | 0 | 5.0 | 10.0 | 15.0 | 0 | 0 | 0 | 0 | 0 | 0 |
| SPBD (150° C.) | 0 | 0 | 0 | 0 | 5.0 | 10.0 | 15.0 | 0 | 0 | 0 |
| SPBD (167° C.) | 0 | 0 | 0 | 0 | 0 | 0 | 0 | 5.0 | 10.0 | 15.0 |
| Cure Properties | | | | | | | | | | |
| Max. Torque | 37.0 | 34.1 | 32.5 | 31.9 | 36.6 | 35.4 | 34.9 | 37.0 | 38.3 | 39.4 |
| Min. Torque | 6.2 | 6.0 | 6.0 | 6.3 | 6.7 | 7.5 | 8.0 | 7.1 | 8.0 | 8.9 |
| Delta Torque | 30.8 | 28.1 | 26.5 | 25.6 | 29.9 | 27.9 | 26.9 | 29.9 | 30.3 | 30.5 |
| t2 min. | 6.0 | 6.2 | 6.2 | 7.2 | 6.3 | 6.3 | 6.8 | 6.1 | 6.3 | 6.1 |
| t25 min. | 7.3 | 7.5 | 7.5 | 8.5 | 7.6 | 7.7 | 8.1 | 7.5 | 7.5 | 7.5 |
| t90 min. | 13.3 | 13.8 | 14.8 | 15.6 | 13.7 | 14.3 | 15.0 | 13.5 | 13.6 | 13.8 |
| Green Strength (Neutons/Sq. Cm.) | | | | | | | | | | |
| Ini. Strength | 19.34 | 24.1 | 28.7 | 35.5 | 24.2 | 28.9 | 36.0 | 23.3 | 28.3 | 28.6 |
| Ini. Elon. % | 60 | 60 | 60 | 40 | 64 | 48 | 40 | 60 | 40 | 24 |
| 100% Elon. | 19.7 | 25.0 | 31.3 | 46.3 | 25.6 | 33.6 | 47.5 | 24.6 | 36.2 | 57.2 |
| 300% Elon. | 21.9 | 32.9 | 50.3 | 88.0 | 33.9 | 64.9 | 90.2 | 30.9 | 63.9 | 129.5 |
| 500% Elon. | 28.3 | 46.1 | 69.6 | 119.0 | 46.9 | 93.8 | 118.3 | 41.7 | 88.7 | 171.7 |
| 700% Elon. | 35.7 | 60.5 | 87.1 | 83.5 | 60.1 | 117.7 | 130.6 | 53.2 | 108.5 | None |
| Ult. Strength | 52.8 | 79.8 | 95.8 | 136.4 | 78.3 | 119.9 | 130.6 | 68.4 | 115.5 | 180.3 |
| Ult. Elon. % | 1185 | 1050 | 855 | 705 | 1080 | 750 | 735 | 1040 | 830 | 640 |
| Rheovibron | | | | | | | | | | |
| Tan 60° C. | .049 | .042 | .045 | .044 | .046 | .047 | .049 | .047 | .054 | .051 |
| Tan 0° C. | .141 | .141 | .128 | .135 | .141 | .122 | .157 | .143 | .148 | .147 |
| E' (60° C.), MPa | 2.83 | 2.70 | 3.21 | 3.68 | 3.63 | 3.48 | 4.21 | 2.99 | 4.37 | 5.29 |
| E' (0° C.), MPa | 3.95 | 3.62 | 4.61 | 5.42 | 6.16 | 5.34 | 7.97 | 4.77 | 9.37 | 13.1 |
| Autographic Stress/Strain-Original - 90% Cure + 10 Min. | | | | | | | | | | |
| Tensile MPa | 17.8 | 19.2 | 18.8 | 17.1 | 19.0 | 17.7 | 19.9 | 18.8 | 19.1 | 18.9 |
| Elongation % | 420 | 490 | 490 | 455 | 465 | 425 | 470 | 450 | 430 | 395 |
| 100% Mod. MPa | 2.4 | 2.5 | 2.7 | 2.8 | 2.5 | 2.9 | 3.4 | 2.5 | 3.2 | 4.1 |
| 200% Mod. MPa | 6.2 | 6.1 | 6.3 | 6.3 | 6.2 | 6.7 | 7.6 | 6.2 | 7.5 | 9.0 |
| 300% Mod. MPa | 11.4 | 10.8 | 10.7 | 10.6 | 11.1 | 11.6 | 12.4 | 11.2 | 12.7 | 14.3 |
| 400% Mod. MPa | 16.6 | 15.5 | 15.2 | 15.0 | 16.2 | 16.6 | 17.0 | 16.4 | 17.8 | — |
| Rebound (Hot, Orig., Aged 14 Days at 70° C., Aged 10 Days at 120° C.) | | | | | | | | | | |
| % (Orig.) | 84.2 | 84.8 | 86.0 | 84.8 | 86.0 | 84.2 | 84.2 | 84.2 | 83.6 | 81.2 |
| % (14 Days) | 86.0 | 86.6 | 86.6 | 86.0 | 87.2 | 85.4 | 85.4 | 86.0 | 84.8 | 84.2 |
| % (10 Days) | 75.2 | 77.0 | 76.5 | 77.0 | 76.5 | 75.8 | 76.5 | 75.8 | 75.2 | 74.6 |

EXAMPLE 39

An oil extended sample of SPBD having a melting point of 184° C. containing 50 parts of processing oil per 100 parts of SPBD was added in a BR Banbury mixer at the 15 part level to a tire compound containing 100 parts of natural rubber, 74 parts of filler containing carbon black, silica, and reinforcing resin, 4 parts of processing oil, 8 parts of zinc oxide, 6 parts of sulfur and accelerator and 2 parts of various rubber chemicals. Adhesion to brass coated steel wire was evaluated using the Tire Cord Adhesion Test (TCAT). Samples were prepared and tested according to the procedures described by D. W. Nicholson, D. I. Livingston, and G. S. Fielding-Russell, Tire Science and Technology (1978) 6, 114: G. S. Fielding-Russell and D. I. Livingston, Rubber Chemistry and Technology (1980) 53, 950: and R. L. Rongone, D. W. Nicholson and R. E. Payne, U.S. Pat. No. 4,095,465 (June 20, 1978).

A control which did not contain any SPBD was also prepared and tested. The control had a pullout force of 298N (Newtons). The SPBD containing compound had a pullout force of 365N. After aging the samples for 20 days in nitrogen at 120° C., the control gave a pullout force value of 272N and the SPBD containing compound had a pullout force of 315N. After aging for 10 days at 95% relative humidity at 75° C., the pullout force of the control was determined to be 307N and the SPBD containing compound had a pullout force of 365N. This example shows that SPBD can be used to improve rubber to metal adhesion. Thus, it is beneficial to incorporate SPBD into wire coating formulations.

While certain representative embodiments and details have been shown for the purpose of illustrating the subject invention, it will be apparent to those skilled in this art that various changes and modifications can be made therein without departing from the scope of the subject invention.

What is claimed is:

1. A pneumatic rubber tire which comprises a circumferential rubber tread, a supporting carcass therefor, two spaced beads, two rubber sidewalls connecting said beads and an innerliner: wherein said innerliner is comprised of from 1 to 30 phr of syndiotactic-1,2-polybutadiene and at least one rubber selected from the group consisting of polyisoprene and halogenated butyl rubbers, wherein said syndiotactic-1,2-polybutadiene has a melting point which is within the range of 120° C. to 160° C.

2. A pneumatic rubber tire as specified in claim 1 wherein the member selected from the group consisting of polyisoprene and halogenated butyl rubbers is polyisoprene.

3. A pneumatic rubber as specified in claim 1 wherein said member selected from the group consisting of polyisoprene and halogenated butyl rubbers is a halogenated butyl rubber.

4. A pneumatic rubber tire as specified in claim 2 wherein said syndiotactic-1,2-polybutadiene has a melting point within the range of 125° C. to 160° C.

5. A pneumatic rubber tire as specified in claim 3 wherein said halogenated butyl rubber is a member selected from the group consisting of chlorobutyl rubbers and bromobutyl rubbers; and wherein said syndiotactic-1,2-polybutadiene has a melting point which is within the range of 125° C. to 150° C.

6. A pneumatic rubber tire as specified in claim 4 wherein said innerliner is comprised of from 2.5 to 15 phr of said syndiotactic-1,2-polybutadiene.

7. A pneumatic rubber tire as specified in claim 5 wherein said innerliner is comprised of from 2.5 to 15 phr of said syndiotactic-1,2-polybutadiene.

8. A pneumatic rubber tire as specified in claim 4 wherein said innerliner is comprised of from 5 phr to 10 phr of said syndiotactic-1,2-polybutadiene.

9. A pneumatic rubber tire as specified in claim 5 wherein said innerliner is comprised of from 5 phr to 10 phr of said syndiotactic-1,2-polybutadiene.

10. A pneumatic rubber tire as specified in claim 9 wherein said syndiotactic-1,2-polybutadiene has a melting point which is within the range of 130° C. to 140° C.

11. A pneumatic rubber tire as specified in claim 3 wherein said innerliner further comprises carbon black and sulfur.

12. A pneumatic rubber tire as specified in claim 1 wherein said syndiotactic-1,2-polybutadiene was synthesized in an aqueous medium.

13. In a method of preparing a pneumatic rubber tire which includes (a) building an unvulcanized tire which is comprised of a circumferential rubber tread, a supporting carcass therefor, two spaced beads, two rubber sidewalls connecting said beads and an innerliner, and (b) shaping and vulcanizing said tire under conditions of heat and pressure; the improvement which comprises utilizing as the innerliner a rubber composition which is comprised of from 1 to 30 phr of syndiotactic-1,2-polybutadiene and at least one rubber selected from the group consisting of polyisoprene and halogenated butyl rubbers, wherein said syndiotactic-1,2-polybutadiene has a melting point which is within the range of 120° C. to 160° C.; and wherein the rubber composition was prepared by mixing at a temperature which was at least as high as the melting point of the syndiotactic-1,2-polybutadiene; and wherein the syndiotactic-1,2-polybutadiene utilized was in the form of a powder having a particle size of less than about 40 mesh.

14. A method of preparing a pneumatic rubber tire as specified in claim 13 wherein said member selected from the group consisting of polyisoprene and halogenated butyl rubbers is a halogenated butyl rubber; and wherein said syndiotactic-1,2-polybutadiene has a melting point which is within the range 125° C. to 150° C.

* * * * *